United States Patent
Crotty, III et al.

(10) Patent No.: US 6,409,245 B1
(45) Date of Patent: *Jun. 25, 2002

(54) SUNVISOR ASSEMBLY HAVING A ROUNDED EDGE

(76) Inventors: Willard E. Crotty, III, 89 Miller Dr., Quincy, MI (US) 49082; Mark A. Tom, 9914 Tomahawk Trail, Coldwater, MI (US) 49036

( * ) Notice: Subject to any disclaimer, the term of this patent is extended or adjusted under 35 U.S.C. 154(b) by 0 days.

This patent is subject to a terminal disclaimer.

(21) Appl. No.: 09/920,129

(22) Filed: Aug. 1, 2001

Related U.S. Application Data

(62) Division of application No. 09/515,315, filed on Feb. 29, 2000, now Pat. No. 6,302,467.
(60) Provisional application No. 60/122,298, filed on Mar. 1, 1999.

(51) Int. Cl.[7] .................................................. B60J 3/00
(52) U.S. Cl. ...................... 296/97.1; 296/97.1; 29/91.6; 29/91.2
(58) Field of Search .......................... 296/97.1; 29/91.6, 29/91.2

(56) References Cited

U.S. PATENT DOCUMENTS

| 4,494,789 A | 1/1985 | Flowerday |
| 4,763,946 A | 8/1988 | Robbins et al. |
| 4,998,765 A | 3/1991 | Van Order et al. |
| 5,007,532 A | 4/1991 | Binish |
| 5,031,951 A | 7/1991 | Binish |
| 5,042,867 A | 8/1991 | Crotty, III et al. |
| 5,580,118 A | 12/1996 | Crotty, III |
| 5,716,092 A | 2/1998 | Dellinger et al. |
| 5,779,298 A | 7/1998 | Smelser et al. |
| 5,860,690 A | 1/1999 | Dellinger et al. |
| 5,887,933 A | 3/1999 | Peterson |
| 5,975,616 A | 11/1999 | Eple et al. |
| 5,984,398 A | 11/1999 | Crotty, III |
| 6,033,005 A | 3/2000 | Crotty, III |
| 6,131,985 A | 10/2000 | Twietmeyer et al. |

FOREIGN PATENT DOCUMENTS

| BE | 0554659 | 1/1960 | ................ 296/97.1 |
| FR | 1222768 | 6/1960 | ................ 296/97.1 |

*Primary Examiner*—Ken Patel

(57) ABSTRACT

A sun visor assembly having a rounded member partially defining the outer edge of the sun visor which forms a more user-friendly edge than existing sun visor designs. The sun visor is formed from a substantially flat foundation that is folded unto itself thereby forming two foundation halves. The halves have corresponding shapes that define the edge of the sun visor. An upholstery cover covers the foundation and forms an exterior surface of the sun visor. A bead member is attached to the foundation and includes a stem portion that attaches to the foundation. The bead member also includes the rounded member whose surface forms a substantially semicircular cross section which faces away from the sun visor. In one embodiment, the rounded member is integrally formed with the foundation, itself, and this embodiment therefore does not include an additional bead member.

3 Claims, 13 Drawing Sheets

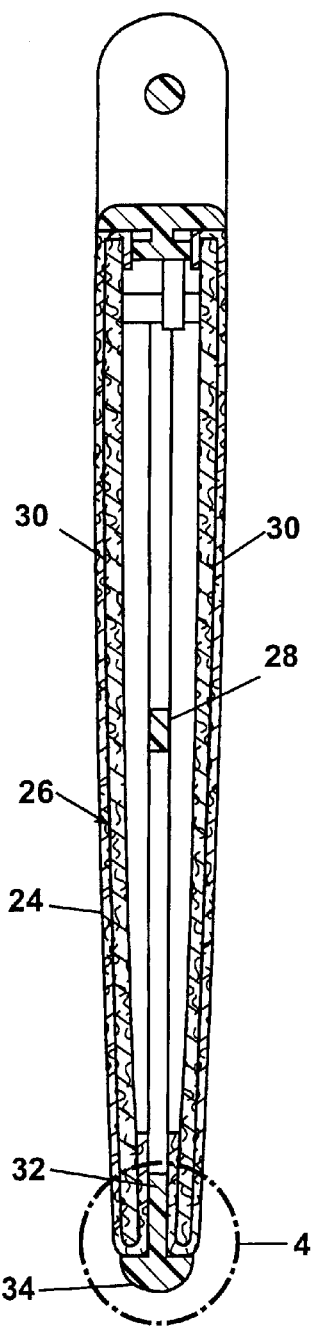
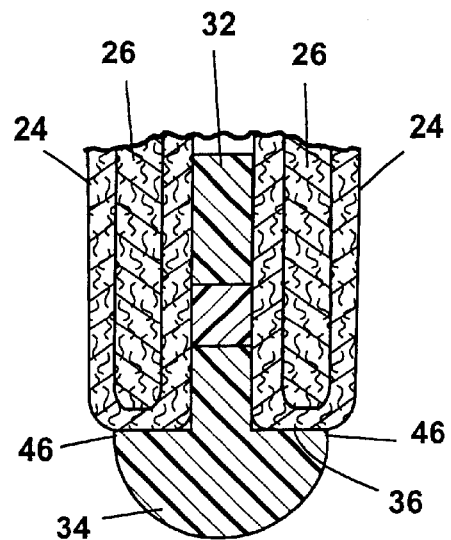
Fig. 4
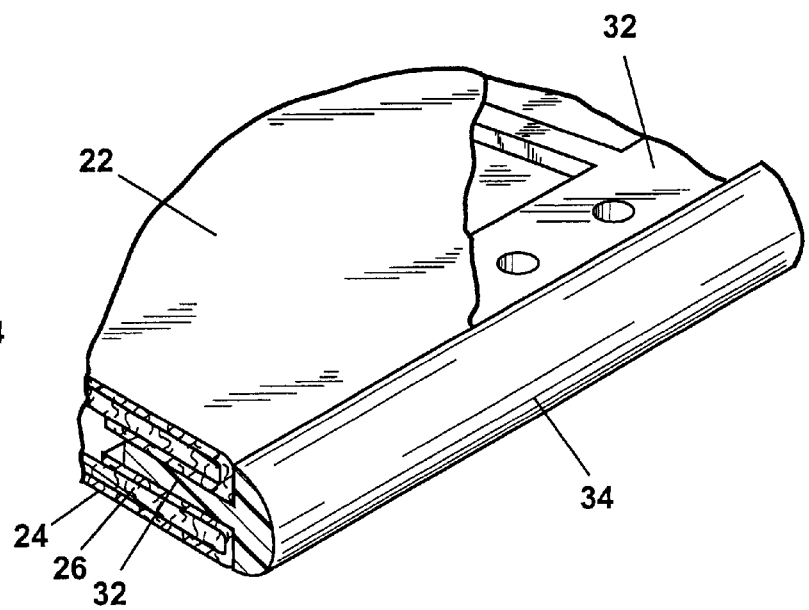
Fig. 2A
Fig. 3

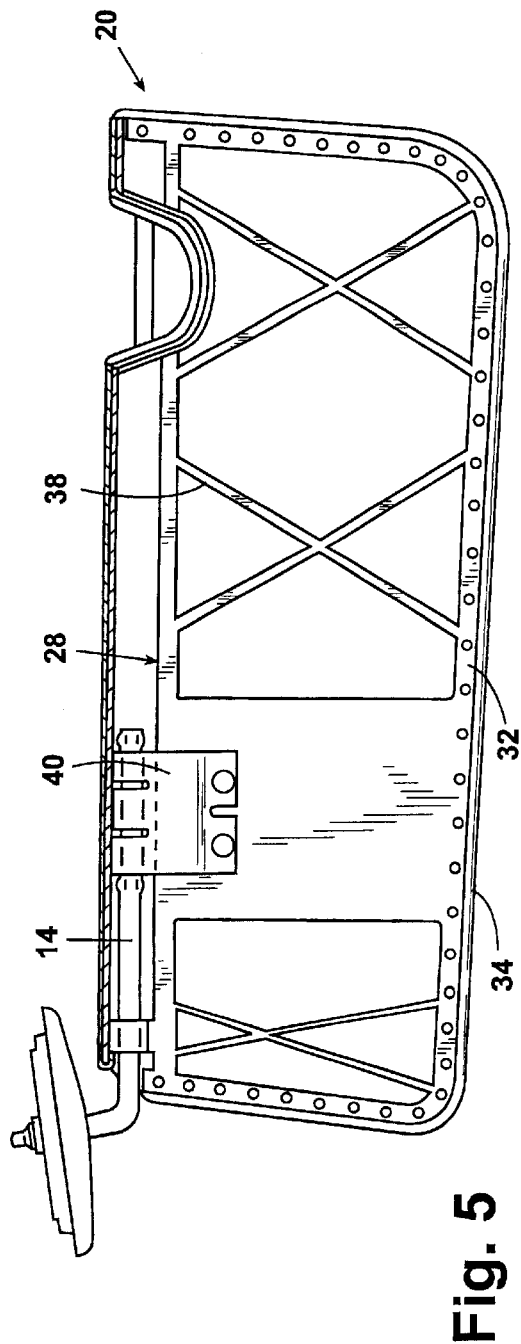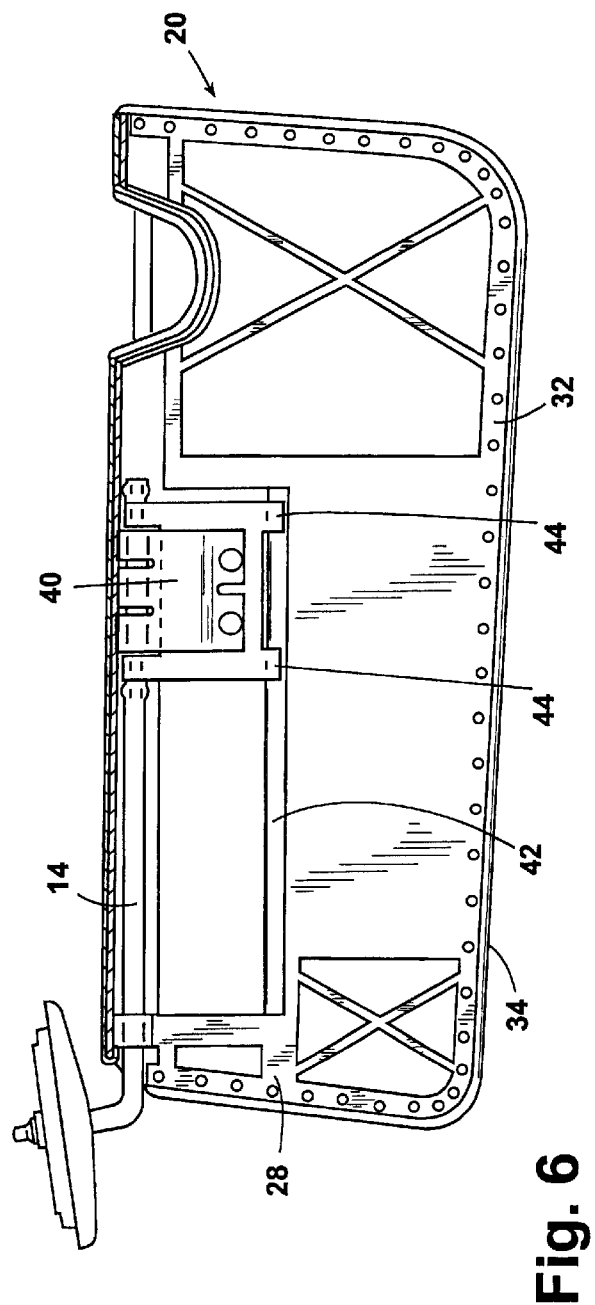

SUNVISOR ASSEMBLY HAVING A ROUNDED EDGE

This application is a divisional of U.S. Ser. No. 09/515,315 filed on Feb. 29, 2000 now U.S. Pat. No. 6,302,467 that claims benefit under 35 U.S.C. §119(e) of U.S. Provisional Application Ser. No.: 60/122,298 filed Mar. 1, 1999.

BACKGROUND OF THE INVENTION

The present invention relates generally to sun visors for vehicles, and, in particular, to the shape of the edge of the sun visor.

Over the past several decades, automobile designs have become safer in many respects, one of which relates to the interior compartment the driver and passengers occupy. Specifically, the design of dash boards, steering wheels, handles, control knobs and other interior components has become smoother and softer. Generally speaking, hard, protruding surfaces have been replaced with softer, rounded surfaces wherever possible. One interior component which has undergone such improvements is the sun visor.

One sun visor design is disclosed in U.S. Pat. No. 5,580,118 (Crotty, III), owned by the assignee of the present invention and hereby incorporated by reference. The design disclosed in the '118 patent involves an outer cover assembly which folds unto itself and sandwiches a core member therebetween. The exterior cover assembly is made of a cloth or vinyl upholstery covering, which is adhesively bonded to a semirigid foundation, typically formed of kraft paper. The upholstery cover is made larger than the foundation and thereby folds around the edges of the foundation. Thus, when the sun visor is folded in half, the outer edges of the cover assembly are sandwiched together and define the profile of the sun visor. The core member is disposed between the foundation halves and connects to a rod, which in turn connects to the interior headliner of the vehicle.

It is desirable to improve upon the above-referenced design.

SUMMARY OF THE INVENTION

The present invention provides a sun visor having a rounded member that partially defines the outer periphery of the sun visor. The rounded member avoids the undesirable bifurcated shape of the edge formed when two cover halves of a foldable foundation are sandwiched together, as occurs in prior art sun visors.

The basic design of sun visor as disclosed in U.S. Pat. No. 5,580,118 has certain advantages in terms of production costs, functionality and reliability. Moreover, the design disclosed in the '118 patent has gained a solid reputation throughout the automotive industry. However, international authorities have recently promulgated regulations which impose design constraints on sun visors. One particular restriction requires the contactable edges of non-rigid parts to have a radius of not less than 3.2 mm. Such a requirement poses a design problem with the type of sun visor disclosed in the '118 patent, which problem is addressed by the present invention.

In one form thereof, the present invention provides a sun visor assembly comprising a substantially flat foundation folded unto itself thereby forming two foundation halves. The halves have corresponding shapes that define an edge of the sun visor. An upholstery cover covers the foundation and forms an exterior surface of the sun visor. A bead member is attached to the foundation and is positioned proximate the edge, the bead member comprising a rounded member whose surface comprises a substantially semicircular cross section. The surface faces away from the sun visor, whereby the edge comprises a radius.

In a preferred form thereof, the bead member further comprises a stem member extending from the rounded member, the stem member having a substantially flat surface disposed adjacent one of the halves and connected thereto. The stem member comprises a stake extending therefrom, the stake extending through the one half and heat fused thereto, whereby the stake secures the bead member to the foundation.

In another preferred form, the stem member comprises a pair of stem members, a first one of the pair abutting the first half and a second one of the pair abutting the second half. More preferably, the first and said second ones of the pair of stem members abut outside surfaces of the foundation halves.

In another preferred form, the rounded member has a radius of at least 3.2 mm, more preferably at least 3.5 mm.

The advantage of the present invention is that it provides a sun visor having a rounded periphery which is safer for the occupant of the vehicle.

Another advantage of the present invention is that its design is compatible with prior art sun visor designs and manufacturing processes. Thus, the sun visor provided by the present invention is cost effective to produce.

BRIEF DESCRIPTION OF THE DRAWINGS

The advantages and objects of this invention and the manner of attaining them, will become more apparent and the invention itself will be better understood by reference to the following description of embodiments of the invention taken in conjunction with the accompanying drawings, wherein:

FIG. 2a is an enlarged fragmentary perspective view of the portion indicated in FIG. 2;

FIG. 3 is a cross sectional view taken along lines 3—3 of FIG. 2;

FIG. 4 is an enlarged fragmentary sectional view of the portion of the sun visor indicated in FIG. 3;

FIG. 5 is a plan view of the core member of one disclosed embodiment;

FIG. 6 is a plan view of a core member of a second disclosed embodiment;

Figure 1:
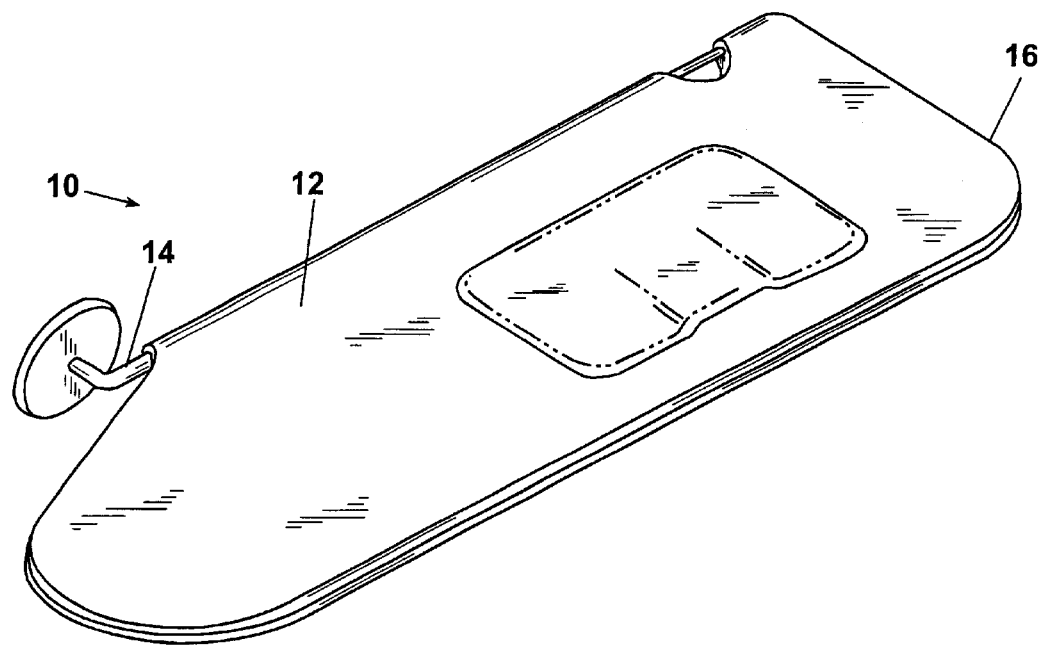
FIG. 1 is a perspective view of a prior art sun visor.

Corresponding reference characters indicate corresponding parts throughout the several views. Although the drawings represent embodiments of the invention, the drawings are not necessarily to scale and certain features may be exaggerated or omitted in order to better illustrate and explain the present invention.

DETAILED DESCRIPTION OF THE INVENTION

Referring to FIG. 1, prior art sun visor 10 includes outer shell assembly 12. The shell is typically formed of a rigid or semi-rigid foundation (not shown) having an upholstery material adhesively bonded thereto. The cover assembly folds unto itself and a core member which attaches to rod 14 is disposed therebetween. Edge 16, which partially defines the periphery of the sun visor, is somewhat undesirable because it is not round. Instead, edge 16 is formed of two corresponding edges of outer assembly 12 which are sewn or adhesively bonded together. A design similar to that shown in FIG. 1 is disclosed and described in U.S. Pat. No. 5,580,118, which is hereby incorporated by reference.

Figure 2:
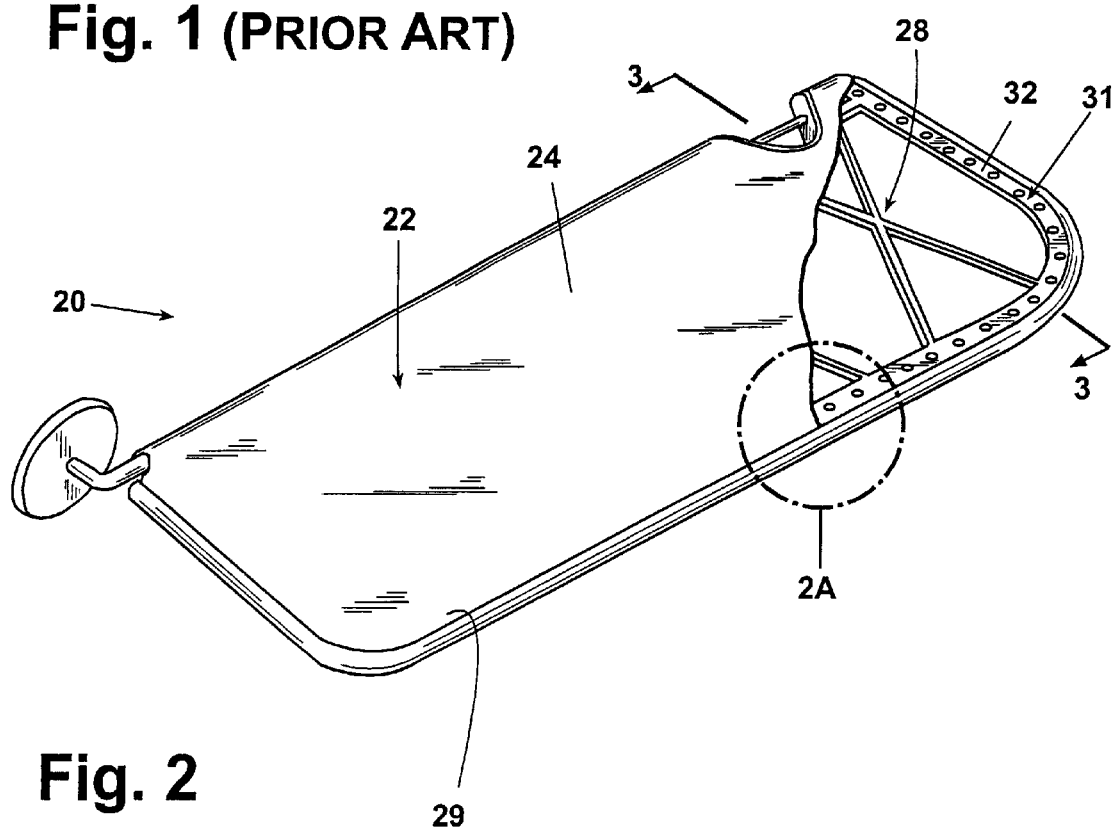
FIG. 2 is a perspective view partially broken away of a sun visor in accordance with the present invention.

FIG. 2 depicts an embodiment in accordance with the present invention. Sun visor assembly 20 includes an outer shell assembly 22 which is made up of upholstery cover 24 overlaying and adhesively bonded to foundation 26 as can be better seen in FIGS. 2a and 3. Foundation 26 is a substantially flat and is folded unto itself thereby forming two foundation halves 30. Halves 30 have corresponding shapes that define the edge 29 of sun visor assembly 20.

Upholstery cover 24 is larger than foundation 26 so that upholstery 24 can be folded around the edges of foundation 26, whereby foundation 26 is totally covered by upholstery 24. Cover assembly 22 can be folded unto itself into two halves 30. Core member 28 is disposed between two halves 30, and is substantially covered by cover assembly 22. Core member 28 further includes a bead member 31 integrally formed at the periphery of core member 28. Bead member 31 includes a stem member 32, which is shown in FIG. 2 as a substantially flat rectangular portion of core member 28 formed about the outer periphery thereof. As shown in FIGS. 2a and 3, core member 28 is sandwiched between halves 30 of outer shell 22.

Advantageously, bead member 31 includes rounded member 34 integrally formed therewith. As shown in FIGS. 2A and 3, stem member 32 terminates substantially in the middle of flat portion 36 of rounded member 34. Corresponding edges 46 (FIG. 4) of cover assembly 22 are positioned adjacent flat portion 36. More particularly, flat portion 34 abuts upholstery material 24 of cover assembly 22 whereas the surface of rounded member 34 faces away from sun visor assembly 20. As shown in FIG. 2, rounded member 34 partially defines the outer edge of sun visor assembly 20, thereby forming a smooth periphery. By contrast, in a prior art sun visor such as that shown in FIG. 1, the edges of the cover assembly are joined together to form a somewhat flat, bifurcated edge 16 as shown in FIG. 1. Advantageously, externally disposed rounded member 34 eliminates prior art edge 16. It can thus be appreciated that rounded member 34 forms a smoother peripheral surface than the prior art sun visor shown in FIG. 1.

The manner of making sun visor assembly 20 is known in the art and therefore need not be described in detail herein. For example, U.S. Pat. No. 5,580,118, owned by the assignee of the present application and hereby incorporated by reference, discloses a sun visor having a foldable outer cover assembly and a core member covered by the cover assembly.

Rounded member 34 can be used with various sunvisor/core member configurations. For example, FIG. 5 illustrates core member 28 having reinforcing ribs 38, stem member 32 and rounded member 34. Hinge block 40 is attached to core member 28 and receives rod 14 which is adapted to attach to a vehicle headliner (not shown). In the embodiment shown in FIG. 5, hinge block 40 can rotate about rod 14 but cannot slide relative thereto. A hinge block 40 like that shown in FIG. 5 is disclosed in U.S. Pat. No. 6,131,985, which is owned by the assignee of the present invention and is hereby incorporated by reference.

FIG. 6 illustrates inventive features of the present invention used with inventive features disclosed in U.S. Pat. No. 6,131,985. Core member 28 includes cylindrical rail 42 which slides within projecting arms 44 of hinge block 40. Thus, core member 28 can slide relative to hinge block 40 and rod 14 as shown in FIG. 6.

Outer assembly 22 can be made from any number of upholstery and foundation materials. For example, U.S. Pat. No. 6,033,005, which is owned by the assignee of the present invention and is hereby incorporated by refernce, discloses a foundation material of expanded polypropylene (EPP) to which the cover material is bonded. Core member 28, such as that shown in either FIG. 5 or 6, including rounded member 34 would perform suitably well with the EPP foundation and sun visor disclosed in U.S. Pat. No. 6,033,005.

Figure 7:
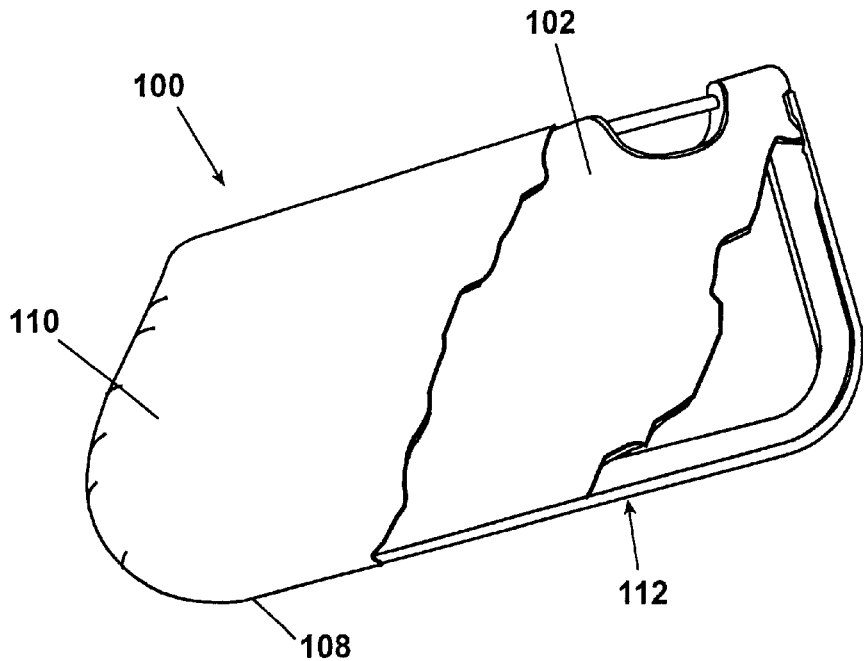
FIG. 7 is a perspective view of a second embodiment incorporating the present invention shown with parts of the cover assembly broken away.
Figure 8:
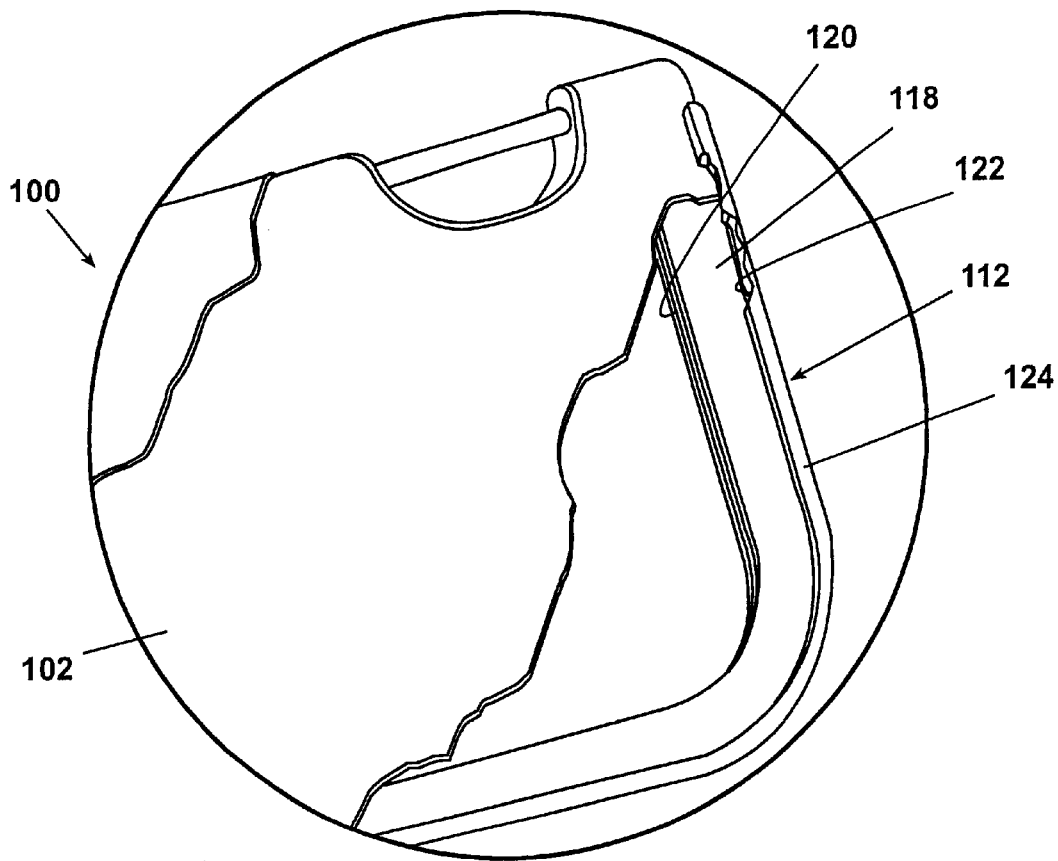
FIG. 8 is an enlarged fragmentary perspective view of the sun visor of FIG. 7.
Figure 9:
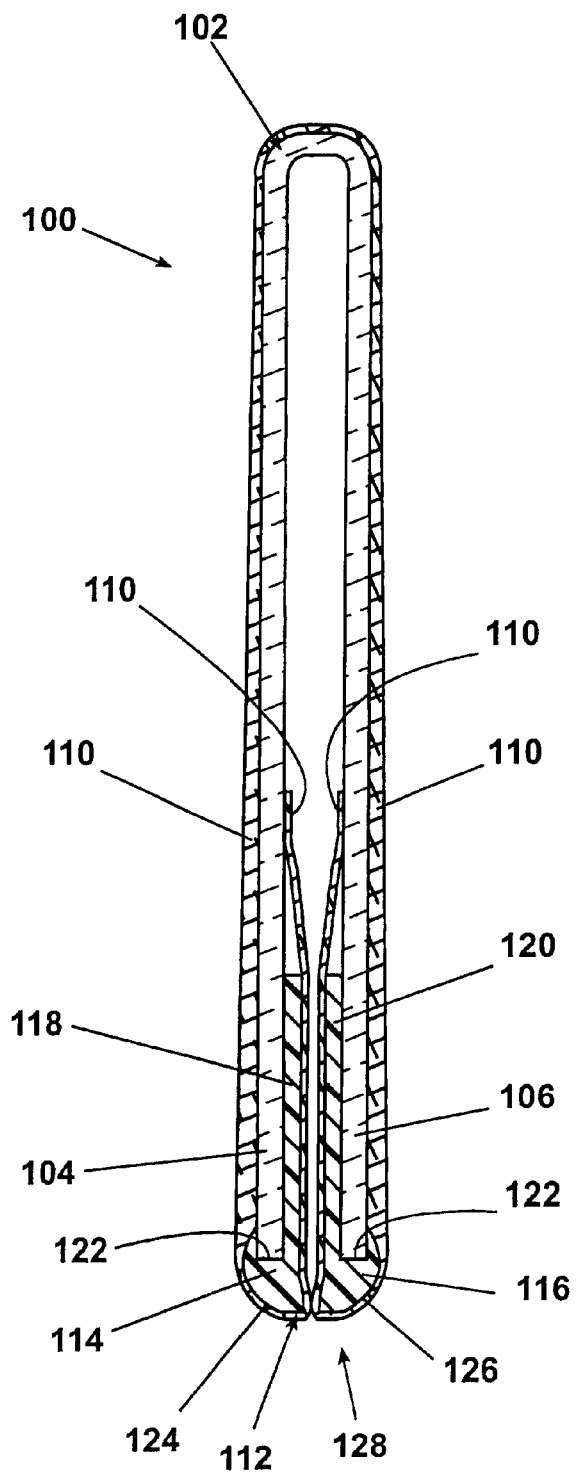
FIG. 9 is a sectional view of the sun visor of FIGS. 7 and 8.

Turning now to FIGS. 7–9, sun visor assembly 100 represents a second embodiment incorporating the present invention. Visor assembly 100 includes a substantially flat foundation 102 folded unto itself thereby forming two foundation halves 104 and 106 (FIG. 9). Halves 104 and 106 have corresponding shapes that define edge 108 of said visor assembly 100. Foundation layer 102 is typically formed of kraft paper, as is well-known in the art. An upholstery cover 110 covers foundation layer 102 and forms an exterior surface of visor assembly 100.

A bead member 112 is attached to foundation 102 and is positioned proximate edge 108. Referring to FIG. 9, it can be appreciated that bead member 112 is actually formed of two substantially identical integrally formed bead member sections 114 and 116. Section 114 includes a stem 118 abutting foundation half 104 and section 116 includes a stem 120 abutting half 106. With further reference to FIG. 9, each of the sections 114 and 116 includes a square groove 122 which receives an edge of foundation 102 by means of a friction fit, which secures bead member sections 114 and 116 to the foundation.

As can be further appreciated from FIG. 9, bead member sections 114 and 116 are formed with substantially symmetrical bulbous portions 124 and 126, respectively.

Bulbous portions 124 and 126 are aligned with and pressed against one another and together define a rounded member 128. That is, instead of a unitary rounded member 34 as described with reference to FIGS. 1–6, rounded member 128 is formed from the two separate bulbous portions 124 and 126. Cover 110 envelops bulbous portions 124 and 126 and bulbous portions 124 and 126 sandwich cover 110 therebetween. As can be appreciated with reference to FIG. 9, the surface of rounded member 128 is of substantially semicircular cross section which faces away from the sun visor, such that the edge of the sun visor forms a radius. It is to be understood, for purposes of this specification, that the term "semicircular" is to be construed broadly to include a surface substantially resembling an arc. For example, rounded member 128 is formed from two discrete bulbous portions 114 and 116, and cover 110 is disposed between bulbous portions 114 and 116. Yet bulbous portions 114 and 116 combine to form a surface having a semicircular cross section as that term is defined in this specification.

Adhesive applied around the inside periphery of the cover or other means known in the art can be employed to adhere the cover to the remainder of the visor assembly. The same or additional adhesive can be employed to adhere the two halves of the "clam-shell" visor together, thereby maintaining the sun visor in the assembled configuration shown in FIG. 9.

In the design shown in FIG. 9, the assembly is performed as is conventionally known, except that it includes the additional step of securing the bead member sections 114 and 116 to foundation halves 104 and 106, respectively, before cover 110 is attached to foundation 102.

Turning now to FIGS. 10–14, sun visor assembly 200 represents a third embodiment incorporating the present invention. Visor assembly 200 includes a substantially flat foundation 202 folded unto itself thereby forming two foundation halves 204 and 206 (shown unfolded in FIGS. 10 and 11). Halves 204 and 206 have corresponding shapes that, when folded together, define edge 208 (FIG. 14) of visor assembly 200. Foundation layer 202 is typically formed of kraft paper, as is well-known in the art. An upholstery cover 210 covers foundation layer 202 and forms an exterior surface of visor assembly 200. Cutouts 211 and 213 are formed in foundation 202 to accommodate a vanity mirror and a clip assembly, respectively, as is known in the art.

Figure 10:
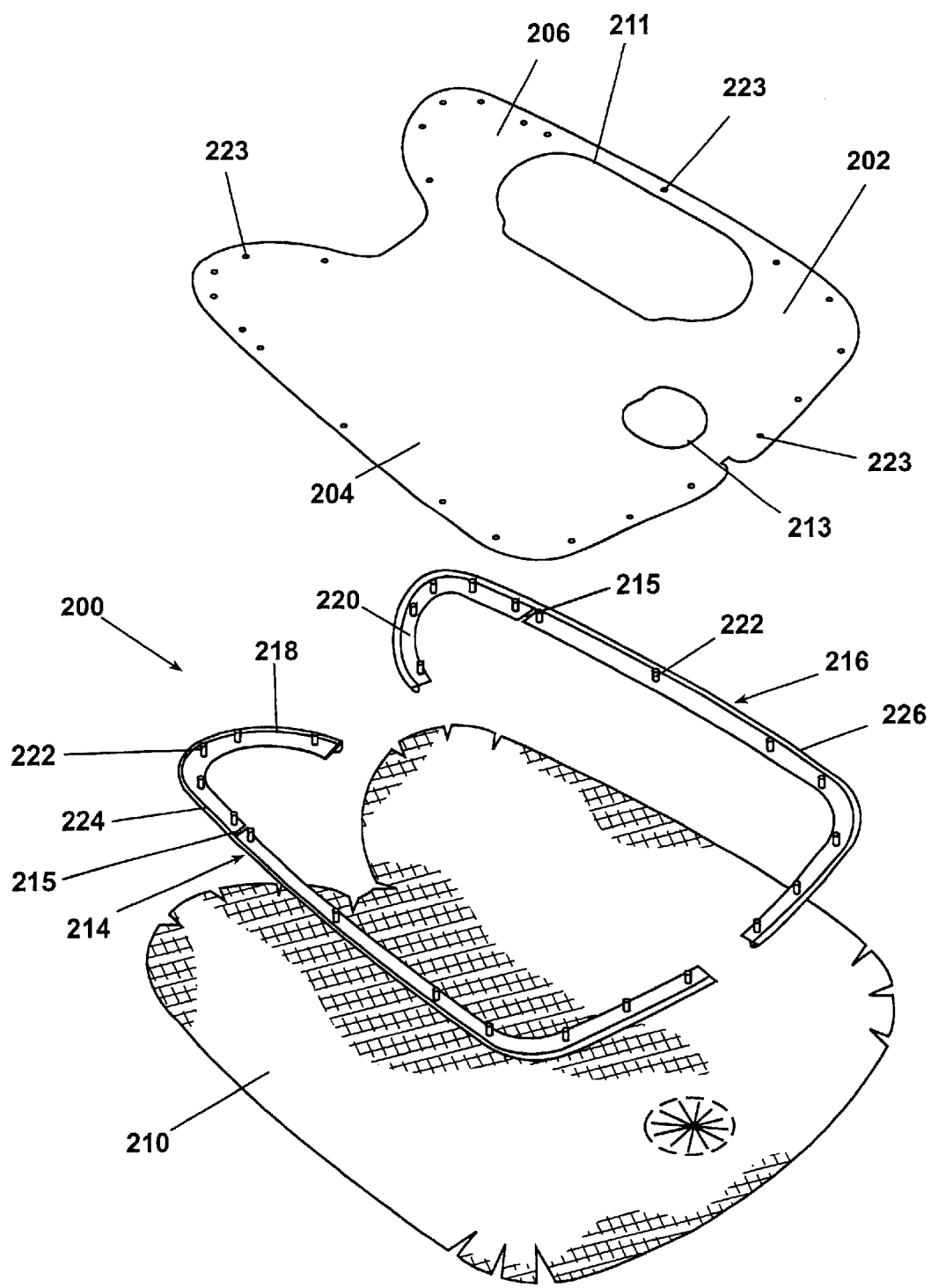
FIG. 10 is an exploded perspective view of a third embodiment incorporating the present invention.
Figure 11:
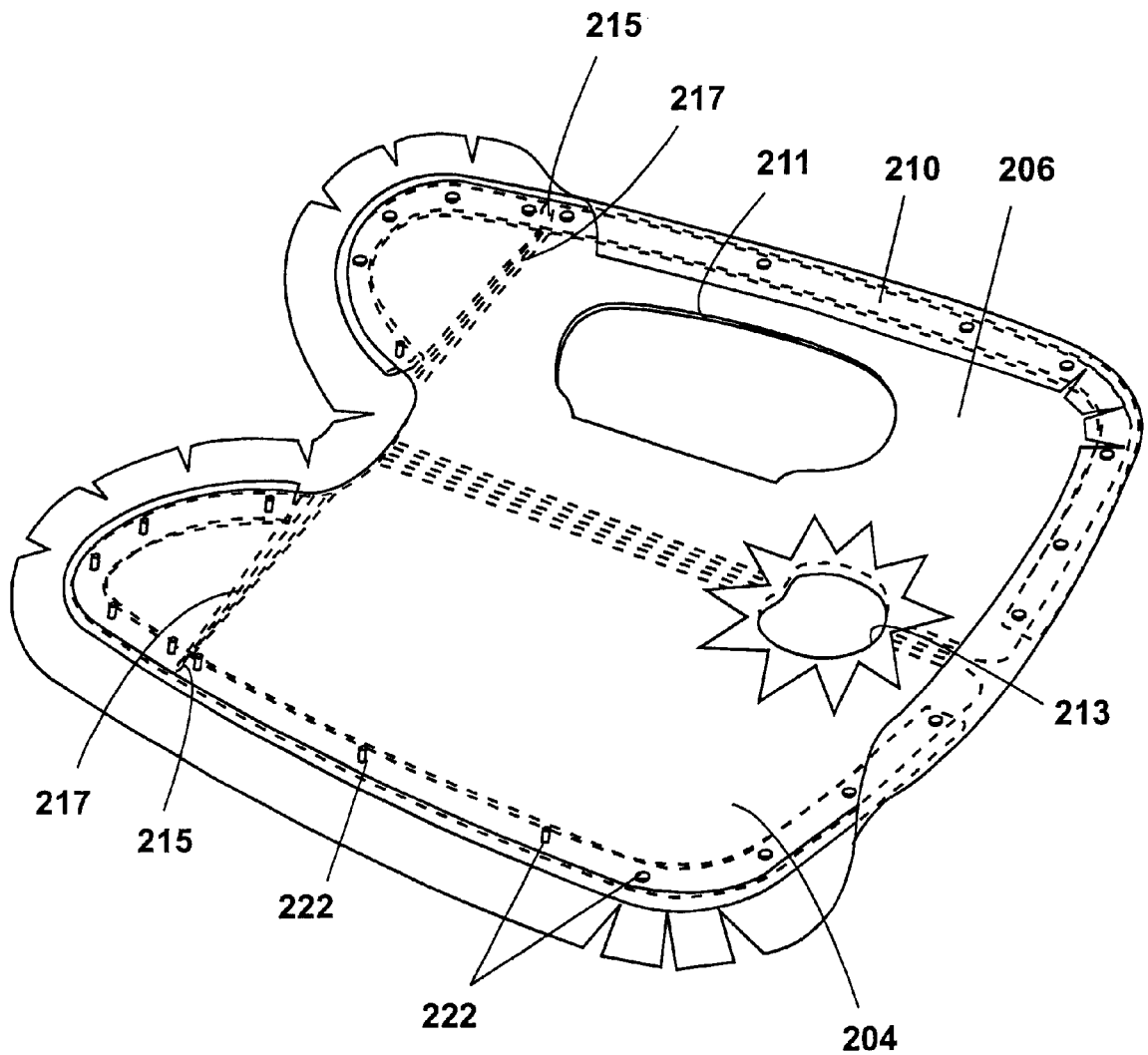
FIG. 11 is a perspective view of the visor of FIG. 10, shown with only part of the cover folded over the edge of the foundation layer to illustrate the heat stake technology, and is shown with only some of the stakes being "fused" to the foundation.
Figure 12A:
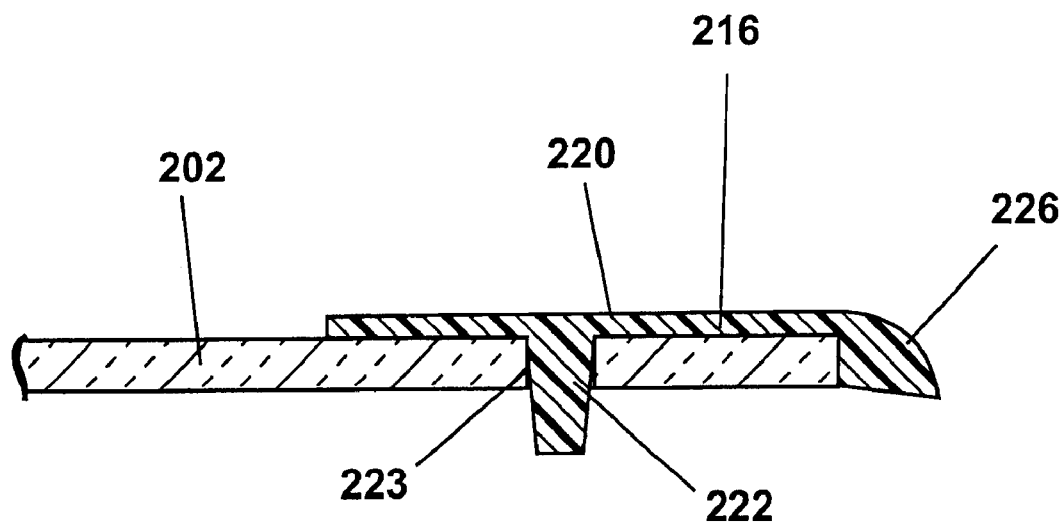
FIGS. 12a and 12b are fragmentary sectional views illustrating a heat stake embodied by the present invention, before and after fusion, respectively.
Figure 12B:
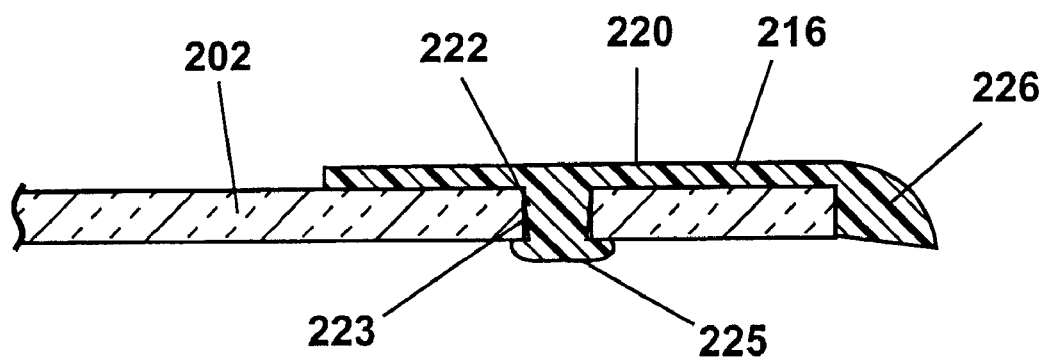
Figure 13:
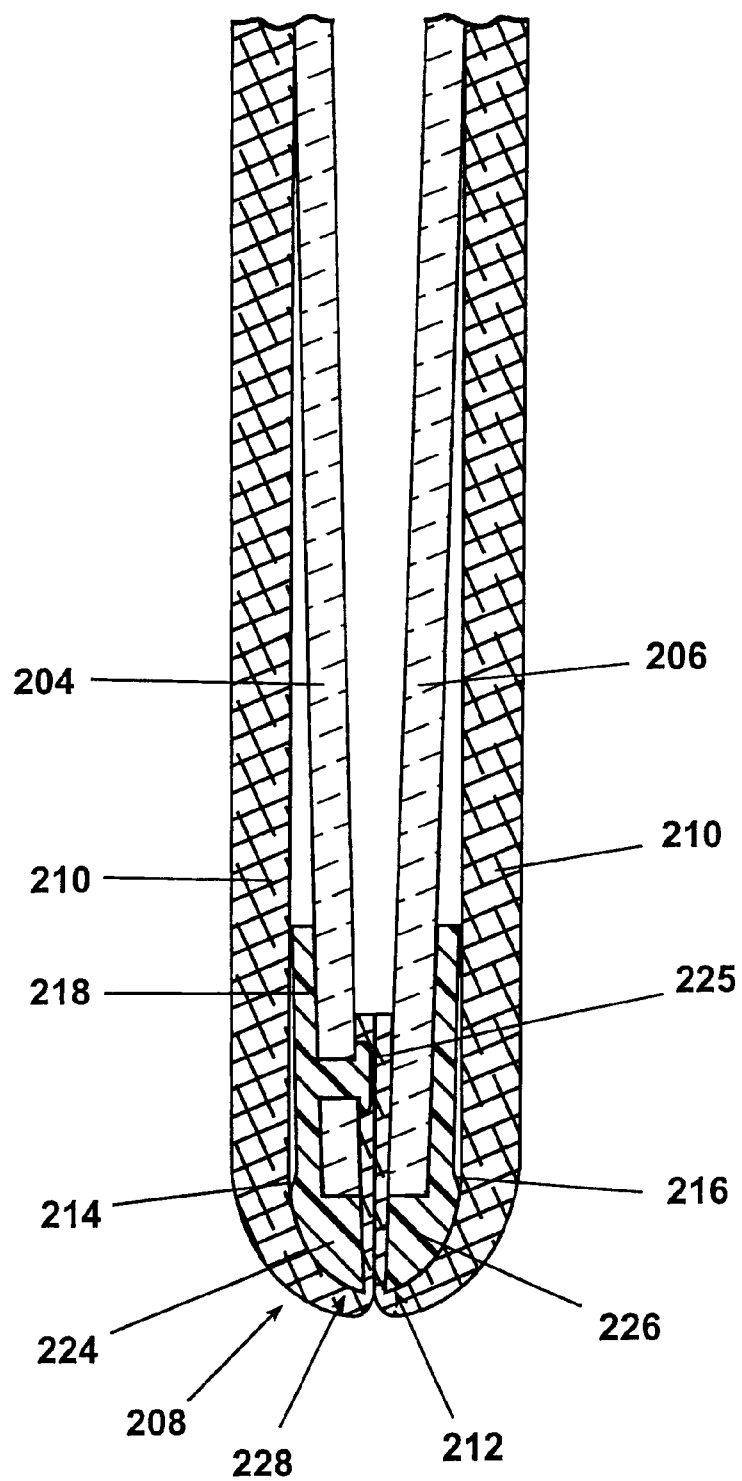
FIG. 13 is a sectional view of the visor shown in FIGS. 11 and 12.
Figure 14:
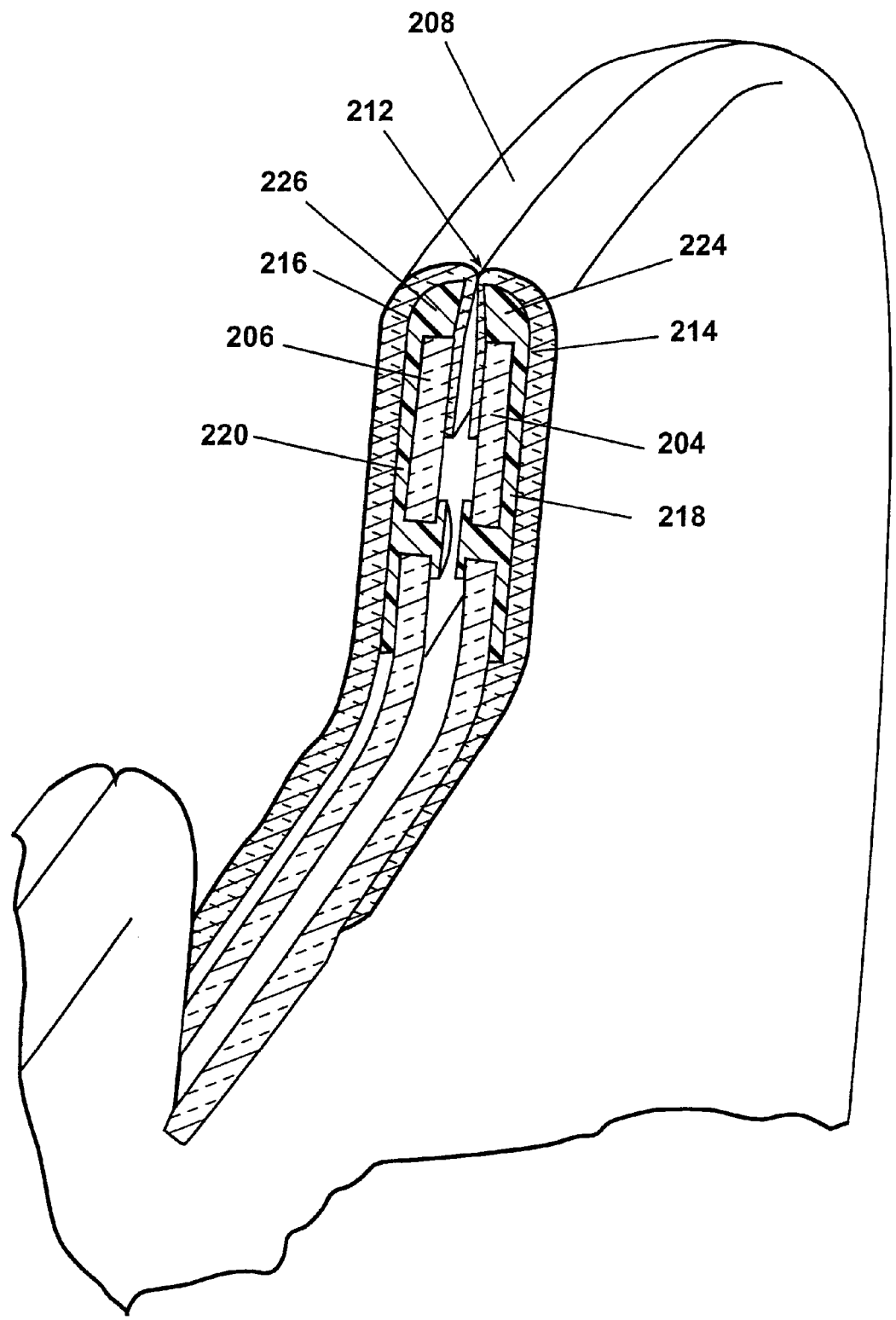
FIG. 14 is a perspective view of the visor shown in FIGS. 11 and 12 and is shown partly in section to illustrate the bead member sections embodying the present invention.

Again referring to the embodiment shown in FIGS. 10–14, it can be appreciated that two substantially identical integrally formed bead member sections 214 and 216 are pressed together to form a bead member 212 (FIGS. 13 and 14) that partially defines the edge 208 of sun visor 200. With further reference to FIGS. 13 and 14, section 214 includes a stem 218 abutting the outside of foundation half 204 and section 216 includes a stem 220 abutting half 206. By contrast, stems 118 and 120 of the second embodiment, described hereinabove with reference to FIGS. 7–9, abut the inside of foundation halves 104 and 106, respectively. As shown in FIGS. 10 and 11, both of bead member sections 214 and 216 include a cutout 215 so that the rounded flap portion of the visor can be bent along crease lines 217 (FIG. 11).

With further reference to FIGS. 10–14, and particularly FIGS. 12a and 12b, stems 218 and 220 of bead member sections 214 and 216, respectively, include a plurality of stakes 222 extending therefrom. Stakes 220 fit through corresponding apertures 223 (FIG. 10) formed in foundation layer 202. FIG. 12a illustrates a stake 222 prior to fusion whereas FIG. 12b illustrates a stake 222 after heat has been applied thereto. FIG. 111 depicts some of the stakes being heat fused and others prior to heat fusion. As the plastic material, which is preferrably polypropylene or ABS plastic, melts during heat staking, it flows downward by the force of gravity toward the foundation 202 and forms a cap 225 that locks stem 220 against foundation 202 and thereby secures the bead member sections 214 and 216 to foundation 202. As can be appreciated with reference to FIG. 14, stakes 222 on opposite stems point toward one another, toward the middle of the sun visor assembly.

The production process of sun visor 200 is substantially the same as is known in the art, except that it includes the additional step of securing bead member sections 214 and 216 to foundation 202 using heat stake technology before securing cover 210 to the foundation.

As can be further appreciated from FIGS. 13 and 14, bead member sections 214 and 216 are formed with substantially symmetrical bulbous portions 224 and 226, respectively. Bulbous portions 224 and 226 are aligned with one another and together define a rounded member 228. Cover 210 envelops bulbous portions 224 and 226 and bulbous portions 224 and 226 sandwich cover 210 therebetween. As can be appreciated with reference to FIGS. 13 and 14, the surface of rounded member 228 is of substantially semicircular cross section and faces away from the sun visor, such that the edge of the sun visor forms a radius. It is preferable that the radius formed by the cross sectional surface of rounded member 228 be at least 3.2 mm, more preferably at least 3.5 mm.

Adhesive applied around the inside periphery of the cover or other means known in the art can be employed to adhere the cover to the remainder of the visor assembly. The same or additional adhesive can be employed to adhere the two halves of the "clam-shell" visor together, thereby maintaining the sun visor in the assembled configuration shown in FIGS. 13 and 14.

Turning now to FIGS. 15–18, sun visor assembly 300 includes a substantially flat foundation 302 preferably formed from kraft paper and which is folded unto itself, thereby forming foundation halves 304 and 306. As in the embodiments disclosed above, sun visor 300 includes an upholstery cover 308 which covers foundation 302 and forms an exterior surface of sun visor 300.

Figures 15, 15A:
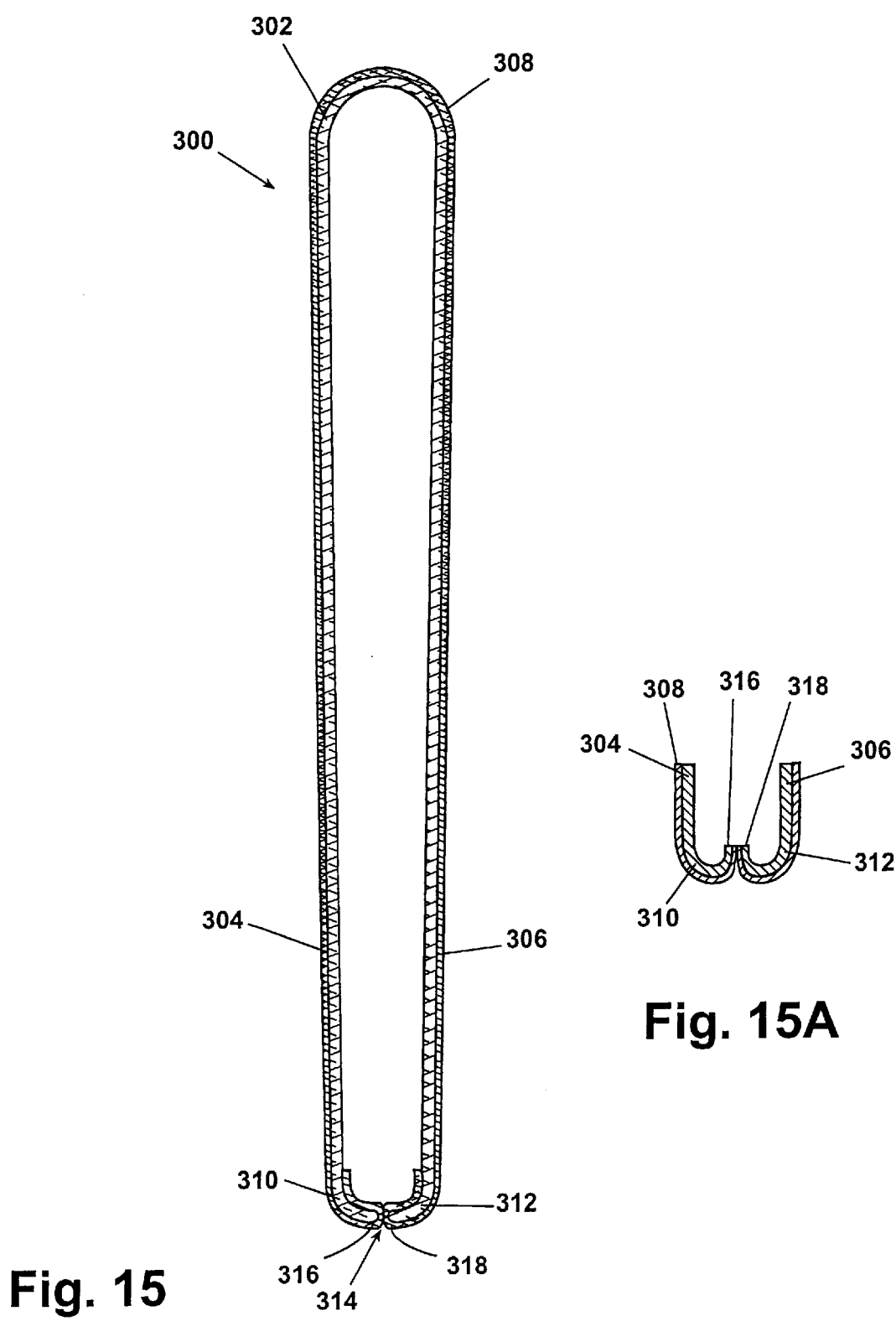
FIG. 15 is a sectional view of a fourth embodiment of the present invention, wherein the foundation layer includes an integrally formed radius edge.
FIG. 15a is a fragmentary sectional view illustrating an alternate mating engagement between the peripheral portions which define the rounded edge of the sun visor.
Figure 16:
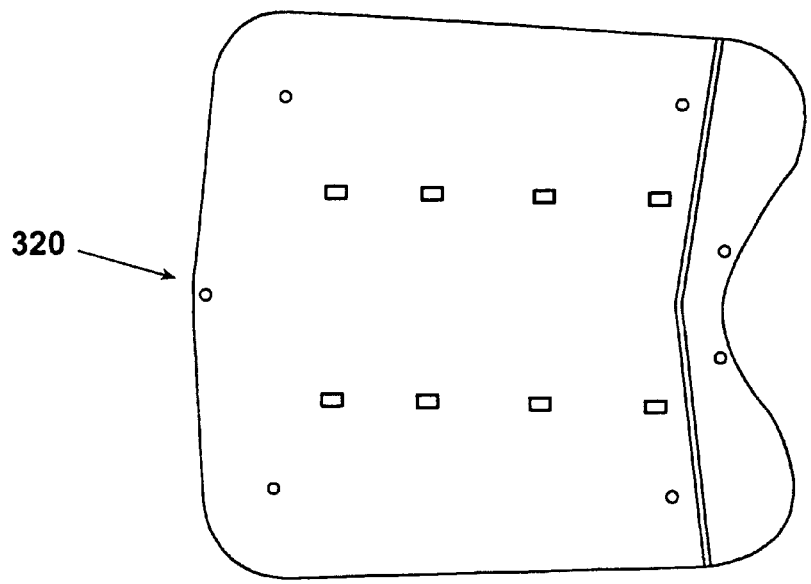
FIG. 16 is a plan view of a bottom die used to form the radius edge on the foundation of the sun visor assembly shown in FIG. 15.

As shown in FIG. 15, half 304 and half 306 each include an integrally formed rounded periphery portion, shown as periphery portions 310 and 312, respectively.

Portions 310 and 312 "mate" with one another to form a rounded member, or edge 314, whose cross-section is semicircular, as that term is defined hereinabove. The term "mate," as used herein, is to be construed broadly to include variations in the way in which periphery portions 310 and 312 may align with one another in an assembled sun visor.

For example, in the embodiment illustrated in FIG. 15, peripheral portions 310 and 312 have ends 316 and 318, respectively, which face and abut one another and sandwich cover 308 therebetween. However, the peripheral portions may "curl up" to a greater extent than shown in FIG. 15, resulting in a configuration like that shown in FIG. 15a. Alternatively, the peripheral portions may overlap (not shown). One skilled in the art would readily recognize other variations in the way in which the separate peripheral portions of visor 300 matingly engage one another, all of which are within the scope of this disclosure.

Visor 300 can be assembled by first die-cutting foundation 302 to the general shape of the sun visor as is known in the art, except that the foundation is formed a bit larger than is conventional to allow for the rounded peripheral portions. As a second step, the foundation is placed between upper and lower dies, like lower die 320 shown in FIG. 16 and upper die 322 shown in FIG. 17.

Figure 17:
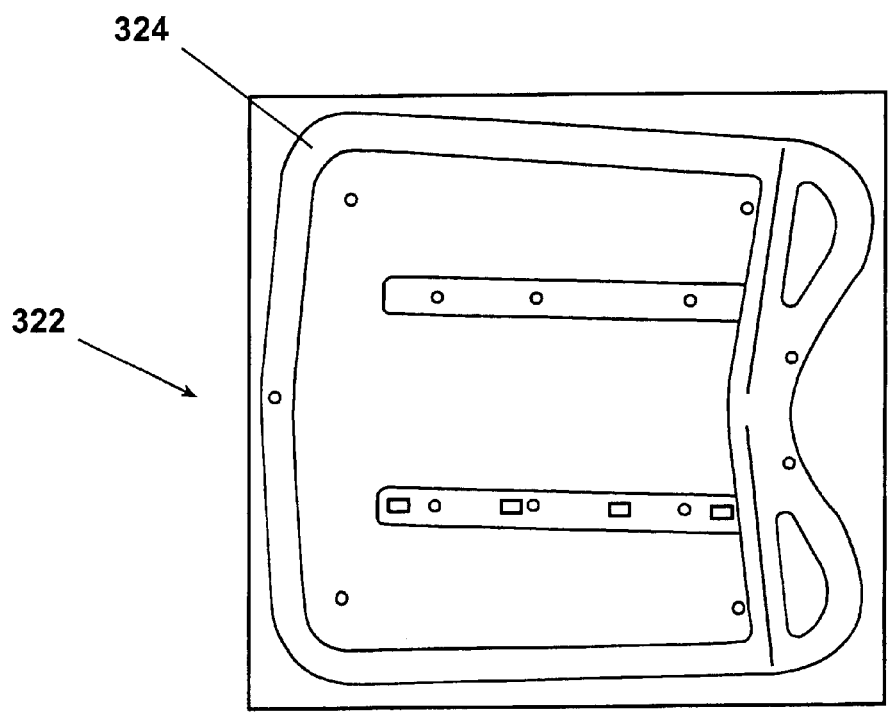
FIG. 17 is a plan view of a top die used to form the radius edge on the foundation of the sun visor assembly shown in FIG. 15.
Figure 18:
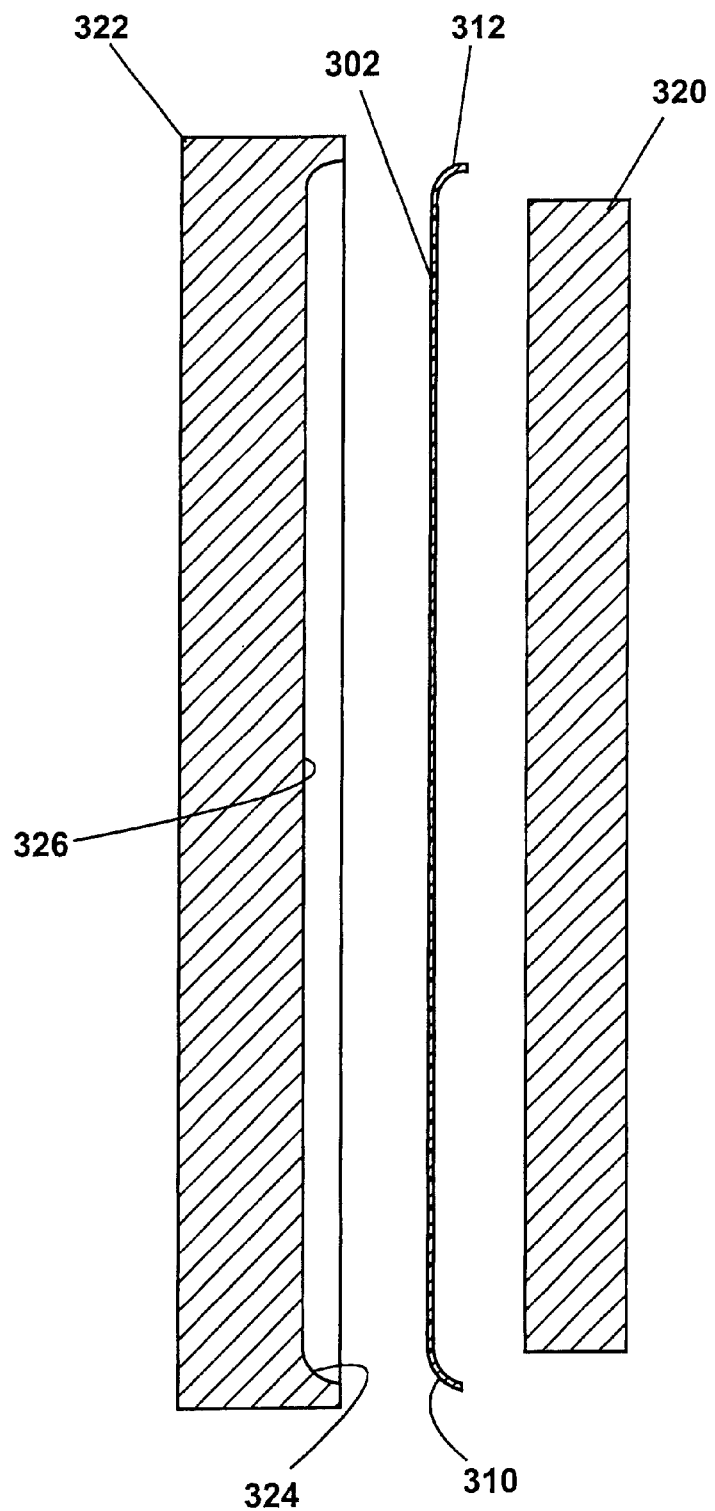
FIG. 18 is a cross sectional view exploded away which depicts the formation of the radius in the foundation of the sun visor assembly using the dies shown in FIGS. 16 and 17.

While lower die 320 (FIG. 16) is substantially flat, upper die 322 includes a radius portion 324 disposed about its outer periphery as shown in FIGS. 17 and 18, which radius forms the rounded periphery of the foundation layer when the dies are pressed together. As shown in FIG. 18, die 322 includes a recess 326 in its center so that lower die 320 (which is smaller than upper die 322) is received within recess 326 of upper die 322, thereby sandwiching foundation 302 therebetween, forming peripheral portions 310 aid 312 of foundation 302. One of ordinary skill in the art would readily recognize other methods and variations of the method described herein for forming the rounded peripheral edge on foundation 302.

After the rounded peripheral portion is formed, upholstery cover 308 is folded around the entire periphery of foundation 302 and glued to foundation 302 using a "hot melt" glue, such as "M2178W Polyester Hot Glue" available from the Findlay company. Next, the necessary holes for the vanity mirror, retention clip, etc. are punched. The upholstery cover is "after cut" to conform to the holes and glued to the foundation as is known in the art. Next, the accessories, such as the vanity mirror and retention clip, are snapped into the respective holes formed therefor. The interior components of the sun visor, such as the rail and core member are then placed between the two halves, and the foundation is sealed together. This final seal is accomplished by applying a secondary glue around the interior edge of the foundation and holding the two halves together until the glue has cured. One such secondary glue suitable for practicing the present invention is "Plio Grip 7400 Urethane Resin," available from Ashland Chemical Corporation.

It can now be appreciated that the design disclosed hereinabove is fully compatible with existing sun visor designs and is especially compatible with a sun visor which includes a cover assembly having a kraft paper foundation which folds unto itself. Such a sun visor design is economical to produce and has been popular for years in many vehicle makes and models.

It will be appreciated that the foregoing is presented by way of illustration only, and not by way of any limitation, and that various alternatives and modifications may be made to the illustrated embodiment without departing from the spirit and scope of the invention as claimed hereinbelow.

What is claimed is:

1. A sun visor assembly comprising a substantially flat foundation folded unto itself and having an upholstery cover covering the foundation and forming an exterior surface of the sun visor:

a pair of substantially identical elongate bead members sections, each of which comprises a bulbous portion having a stem portion extending therefrom, said bulbous portions being capable of alignment with one another to form a rounded member whose surface comprises a substantially semicircular cross section having a radius of at least 2.5 mm.

2. The sun visor assembly of claim 1, wherein said stem members comprise a plurality of stakes extending therefrom, whereby said stakes are adapted to be heat fused into the foundation.

3. The sun visor assembly of claim 1, wherein said rounded member has a radius of at least 3.2 mm.

* * * * *

UNITED STATES PATENT AND TRADEMARK OFFICE
CERTIFICATE OF CORRECTION

PATENT NO. : 6,409,245 B1  
DATED : June 25, 2002  
INVENTOR(S) : Willard E. Crotty, III and Mark A. Tom It is certified that error appears in the above-identified patent and that said Letters Patent is hereby corrected as shown below:

<u>Title page,</u>  
Item [73], Assignee: please insert the Assignee to read: -- Crotty Corporation, Quincy, Michigan --  
Item [74], *Attorney, Agent, or Firm*, please insert the *Attorney, Agent or Firm* to read: -- Rader, Fishman & Grauer, PLLC --

<u>Column 8,</u>  
Line 19, please change "A sun visor assembly comprising" to read -- A sun visor assembly comprising: --.  
Line 22, please change "the sun visor:" to -- the sun visor; --. Move the remaining text of line 19 to line 20 as first indented paragraph, such that the entire claim reads:  
-- 1.   A sun visor assembly comprising:  
   a substantially flat foundation folded unto itself and having an upholstery cover covering the foundation and forming an exterior surface of the sun visor;  
   a pair of substantially identical elongate bead members sections, each of which comprises a bulbous portion having a stem portion extending therefrom, said bulbous portions being capable of alignment with one another to form a rounded member whose surface comprises a substantially semicircular cross section having a radius of at least 2.5 mm. --

Signed and Sealed this

Seventeenth Day of December, 2002

JAMES E. ROGAN  
*Director of the United States Patent and Trademark Office*